United States Patent
Park et al.

(10) Patent No.: US 11,488,732 B2
(45) Date of Patent: Nov. 1, 2022

(54) SECONDARY SHUTDOWN STRUCTURE OF NUCLEAR REACTOR BY USING SLIDING DOORS

(71) Applicant: KEPCO ENGINEERING & CONSTRUCTION COMPANY, INC., Gyeongsangbuk-do (KR)

(72) Inventors: Jin Seok Park, Daejeon (KR); Myoung Goo Lee, Daejeon (KR); Yeon Ho Cho, Daejeon (KR); Hyunmin Kim, Daejeon (KR); Cheol Soo Maeng, Daejeon (KR); Hyeong Heon Kim, Seongnam-si (KR); Byung Jin Lee, Daejeon (KR); Chang Kyu Chung, Sejong-si (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 1114 days.

(21) Appl. No.: 15/933,758

(22) Filed: Mar. 23, 2018

(65) Prior Publication Data
US 2018/0277262 A1  Sep. 27, 2018

(30) Foreign Application Priority Data
Mar. 23, 2017  (KR) .................. 10-2017-0036919

(51) Int. Cl.
*G21C 9/027* (2006.01)
*G21C 7/22* (2006.01)
(Continued)

(52) U.S. Cl.
CPC .............. *G21C 9/027* (2013.01); *G21C 7/22* (2013.01); *G21C 9/02* (2013.01); *G21C 15/18* (2013.01);
(Continued)

(58) Field of Classification Search
CPC ... G21C 7/06; G21C 7/08; G21C 7/12; G21C 7/14; G21C 7/16; G21C 9/00; G21C 9/02;
(Continued)

(56) References Cited

U.S. PATENT DOCUMENTS

| | | | | |
|---|---|---|---|---|
| 3,976,540 A | * | 8/1976 | Sowa | G21C 9/027 376/336 |
| 2013/0272466 A1 | * | 10/2013 | Edwards | G21C 7/16 376/230 |
| 2013/0294559 A1 | | 11/2013 | Sekimoto | |

FOREIGN PATENT DOCUMENTS

| | | |
|---|---|---|
| JP | 05-297176 | 11/1993 |
| JP | 08-248167 | 9/1996 |

(Continued)

OTHER PUBLICATIONS

Korean Notice of Allowance (Application No. 10-2017-0036919), dated May 21, 2018.

*Primary Examiner* — Darlene M Ritchie
(74) *Attorney, Agent, or Firm* — Nixon Peabody LLP; Jeffrey L. Costellia

(57) ABSTRACT

Provided is a secondary shutdown structure of a nuclear reactor, which uses sliding doors, and more particularly, to a secondary shutdown structure of a nuclear reactor, which uses sliding doors and is capable of shutting down a nuclear reactor reliably with a simple structure without using a boric acid solution.

10 Claims, 13 Drawing Sheets

(51) Int. Cl.
  *G21C 9/02* (2006.01)
  *G21C 15/18* (2006.01)
  *G21C 5/02* (2006.01)
  *H01F 7/08* (2006.01)

(52) U.S. Cl.
  CPC .................. *G21C 5/02* (2013.01); *H01F 7/08* (2013.01); *Y02E 30/30* (2013.01)

(58) Field of Classification Search
  CPC . G21C 9/027; G21C 7/22; G21C 5/02; G21C 15/18; Y02E 30/30; H01F 7/08; G21D 3/04
  See application file for complete search history.

(56) References Cited

FOREIGN PATENT DOCUMENTS

| | | |
|---|---|---|
| JP | 2002-196091 | 7/2002 |
| JP | 2012-145353 | 8/2012 |
| KR | 10-2015-0138057 | 12/2015 |

\* cited by examiner

SECONDARY SHUTDOWN STRUCTURE OF NUCLEAR REACTOR BY USING SLIDING DOORS

CROSS-REFERENCE TO RELATED APPLICATION

This application claims the benefit of Korean Patent Application No. 10-2017-0036919, filed on Mar. 23, 2017, in the Korean Intellectual Property Office, the disclosure of which is incorporated herein in its entirety by reference.

BACKGROUND

1. Field

One or more embodiments relate to a secondary shutdown structure of a nuclear reactor, which uses sliding doors, and more particularly, to a secondary shutdown structure of a nuclear reactor, which uses sliding doors and is capable of shutting down a nuclear reactor reliably with a simple structure without using a boric acid solution.

2. Description of the Related Art

Controlling of reactivity of a nuclear reactor is basically implemented via a control rod drive mechanism that is a primary shutdown system. However, a secondary shutdown system that may operate independently from the primary shutdown system is essentially necessary according to nuclear regulatory requirements. According to the related art, the secondary shutdown system is implemented mostly in a manner of injecting boric acid solution. However, usage of the boric acid solution causes a lot of problems, e.g., corrosion of structures, and thus, necessity of a soluble boron-free operation has arisen, and in this case, an additional secondary shutdown system without using boric acid is necessary.

In addition, Korean Laid-open Patent No. 10-2015-0138057 discloses a secondary shutdown structure of a nuclear reactor without using a boric acid solution as illustrated in FIGS. 1 to 3.

Flow of a coolant is generated according to a head generated in a reactor coolant pump (RCP) and there is a lot of loss in the head in a core, and accordingly, a pressure difference is generated between an upper portion 41 and a lower portion 42 of a nuclear reactor core 40. When there is no main passage 500 communicating with a pool 30 of the nuclear reactor, the pool 30 and the upper portion 41 of the reactor core communicate with each other, and thus, an equal pressure is maintained between the pool 30 of the nuclear reactor and the upper portion 41 of the core and there is no flow of the coolant.

Therefore, the lower portion 42 of the reactor core 40 has a negative pressure when compared with the pool 30 of the nuclear reactor (due to a pressure difference). Here, as described above, when the lower portion 42 is configured to communicate with a hydraulic cylinder 100 and includes a piston 400 therein and when a lower portion of the hydraulic cylinder 100 and the pool 30 of the nuclear reactor are connected to the main passage 500, the coolant may flow due to the pressure difference between the pool 30 of the nuclear reactor and the lower portion 42 of the reactor core, and thus, the secondary shutdown mechanism is equipped.

Therefore, a fluid in the pool 30 of the nuclear reactor flows towards the lower portion of the hydraulic cylinder 100 via the main passage 500, and a main piston 420 in the hydraulic cylinder 100 may move upward according to an upward flow of the fluid.

As a result, a shut-off rod 200 provided above the piston 400 is located above and outside the core 40, a fuel rod 300 is located inside the core 40, and this state is maintained while the RCP 10 operates and accordingly the nuclear reactor normally operates.

The secondary shutdown structure of the nuclear reactor according to the related art has the following problems.

To implement the secondary shutdown structure, the secondary shutdown structure of the nuclear reactor according to the related art involves having to install in the nuclear reactor a complicated structure such as the main passage 500 connecting the lower portion of the hydraulic cylinder 100 and the pool 30 of the nuclear reactor, the hydraulic cylinder 100, and the main piston 420, and thus, installation costs increase. In addition, since the structure is complicated, it is difficult to ensure reliability in operations and maintenance costs also increase.

Also, according to the secondary shutdown structure of the related art, the main passage 500, the hydraulic cylinder 100, and the main piston 420 have to be separately installed with respect to each fuel rod, the installation may not be performed easily, and it is also difficult to operate the shutdown structure simultaneously with a plurality of main pistons 420.

The following descriptions are provided for FIGS. 1 to 3.
10: RCP (reactor coolant pump)
20: reactor structure
30: nuclear reactor water tank
40: nuclear reactor core
50: Reactivity control device room
100: hydraulic cylinder
110: locking part
120: damping member
200: stop rod
300: fuel rod
400: piston
410: piston rod
420: main piston
500: main flow
600: bypass flow
610: on/off valve Accordingly, a secondary shutdown structure for a nuclear reactor is necessary, wherein the secondary shutdown structure has a simple structure without using a boric acid solution to improve operating reliability and makes the shutdown structure operate at the same time as it operates.

SUMMARY

One of more embodiments include a secondary shutdown structure for a nuclear reactor, which uses sliding doors, the secondary shutdown structure having a simple structure and having an excellent operating reliability without using a boric acid solution.

Additional aspects will be set forth in part in the description which follows and, in part, will be apparent from the description, or may be learned by practice of the presented embodiments.

According to one or more embodiments, a secondary shutdown structure of a nuclear reactor, the secondary shutdown structure using a sliding door includes: a nuclear reactor vessel including an upper nuclear reactor vessel and a lower nuclear reactor vessel that are coupled to each other; a plurality of guide pipes arranged to be spaced apart from one another among nuclear fuel assemblies in the lower nuclear reactor vessel; a plurality of storage containers arranged in the upper nuclear reactor vessel to respectively correspond to locations of the plurality of guide pipes, wherein each of the plurality of storage containers has a neutron absorber contained therein and has an outlet opening towards each of the plurality of guide pipes; a sliding door provided between the plurality of storage containers and the plurality of guide pipes, the sliding door sliding between an opening location and a closing location and the sliding door having a plurality of through holes communicating with the outlets of the plurality of storage containers at the opening location; and a driver configured to move the sliding door in a horizontal direction, wherein, when the sliding door is at the opening location, the plurality of through holes are aligned with the outlets of the plurality of storage containers and the neutron absorber in each of the plurality of storage containers passes through the through hole to move into each guide pipe, and when the sliding door is at the closing location, the outlet of each storage container is closed and the neutron absorber stays in the storage container.

The driver may be at a side surface of the nuclear reactor vessel.

When the sliding door is at the opening location, the neutron absorber in the storage container may fall down due to a weight thereof to enter the guide pipe.

The driver may include: a body having an accommodation space extending in a direction therein, the body having a coil wound therearound and the body opening towards the sliding door; a fixed magnet fixedly installed in the accommodation space of the body; a movable magnet sliding within the accommodation space of the body, the movable magnet moving towards the fixed magnet by a magnetic force between the fixed magnet and the movable magnet when an electric current is applied to the coil; and a connector configured to connect the movable magnet to the sliding door, wherein the sliding door slides along with the movable magnet by the connector.

A first spring may be provided between the fixed magnet and the movable magnet, the first spring elastically biasing the movable magnet away from the fixed magnet to maintain the sliding door at the closing location.

The body may protrude outwardly from a middle of the nuclear reactor vessel, and communicate with an internal space of the nuclear reactor vessel.

The movable magnet may be closer to the sliding door than the fixed magnet in the accommodation space.

A door supporter may be arranged to be spaced apart from the sliding door, and a second spring may be provided between the door supporter and an end of the sliding door to elastically bias the sliding door towards the closing location.

A third spring may be provided in the storage container to push and drop the neutron absorber downwards.

The sliding door may be configured to drop the neutron absorbers contained respectively in the plurality of storage containers simultaneously towards the lower nuclear reactor vessel.

The nuclear reactor vessel may be provided with a plurality of sliding doors therein, each of the plurality of sliding doors being connected to one driver.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
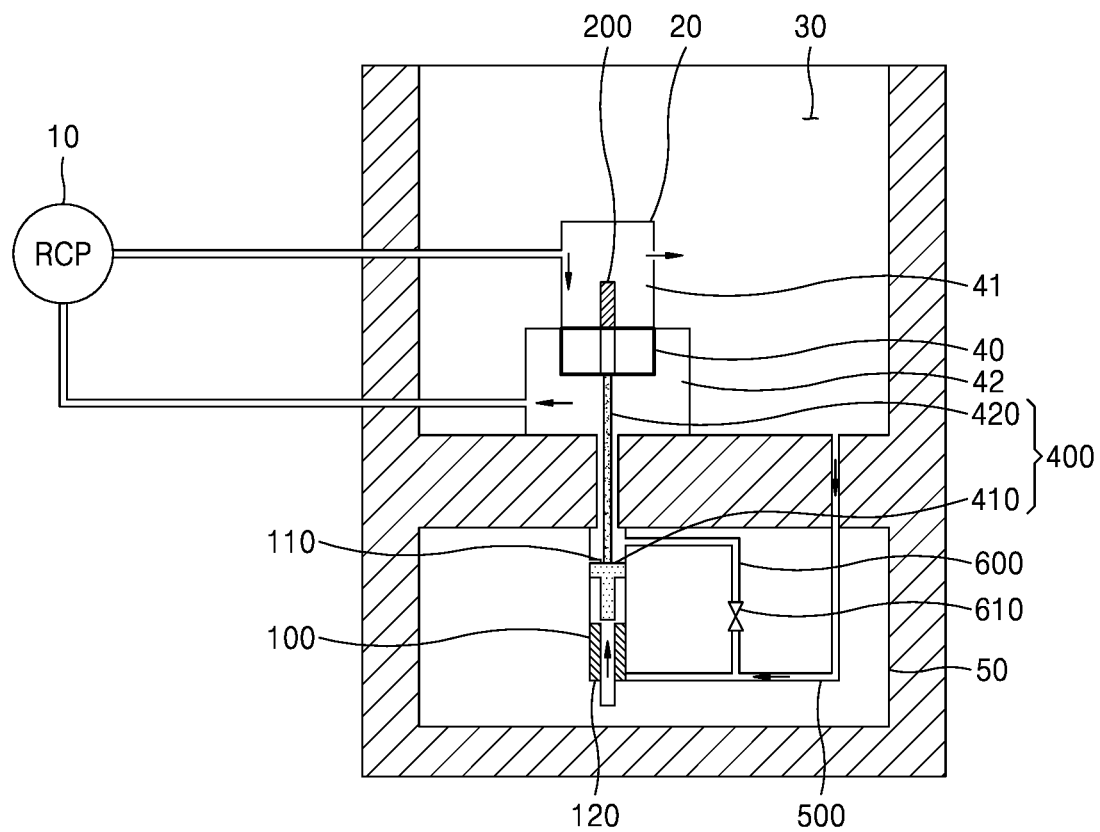
FIG. 1 is a diagram of a secondary shutdown mechanism according to the related art when a nuclear reactor normally operates.
Figure 2:
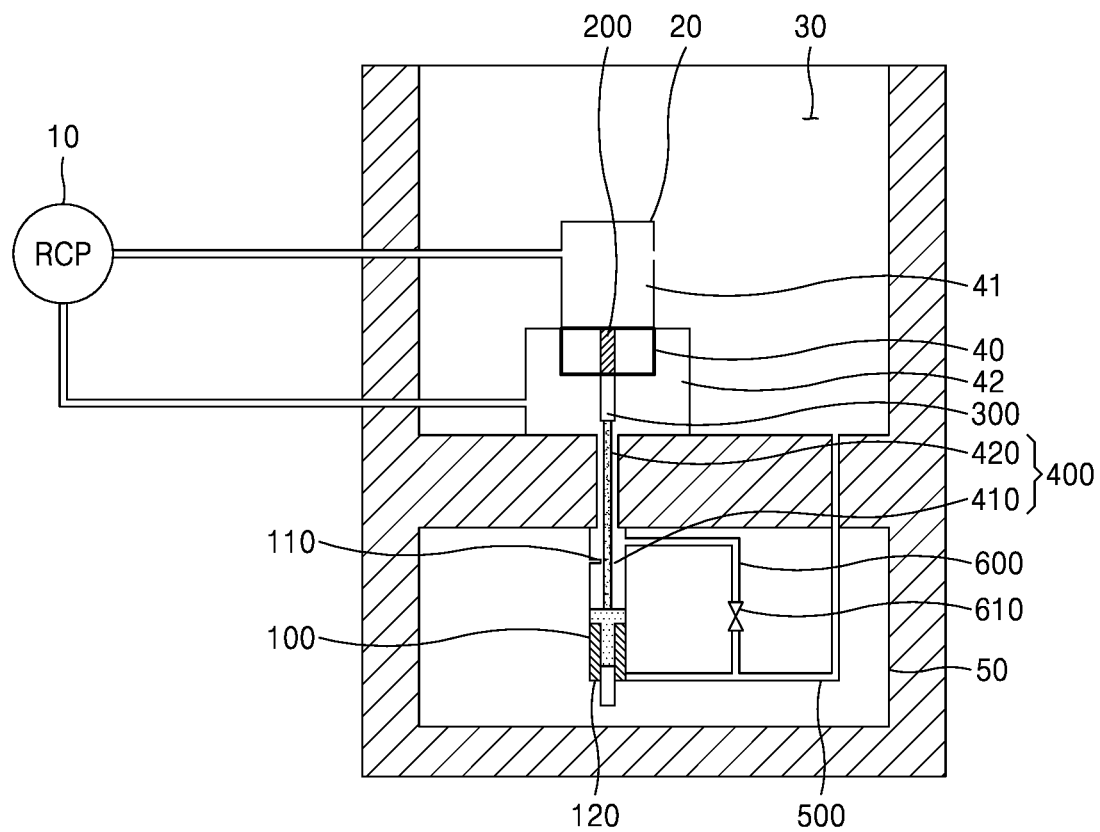
FIG. 2 is a diagram illustrating operations of the secondary shutdown mechanism according to the related art in an emergency.
Figure 3:
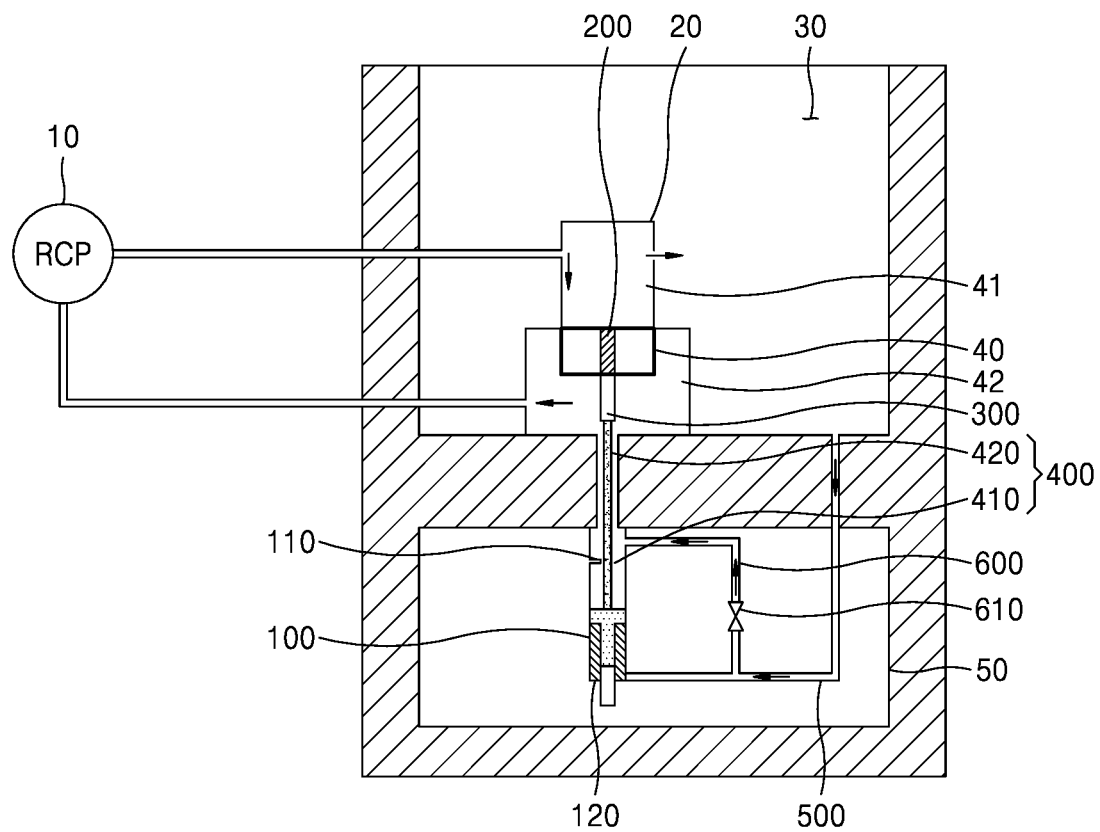
FIG. 3 is a diagram illustrating operations of the secondary shutdown mechanism according to the related art in an emergency.
Figure 4:
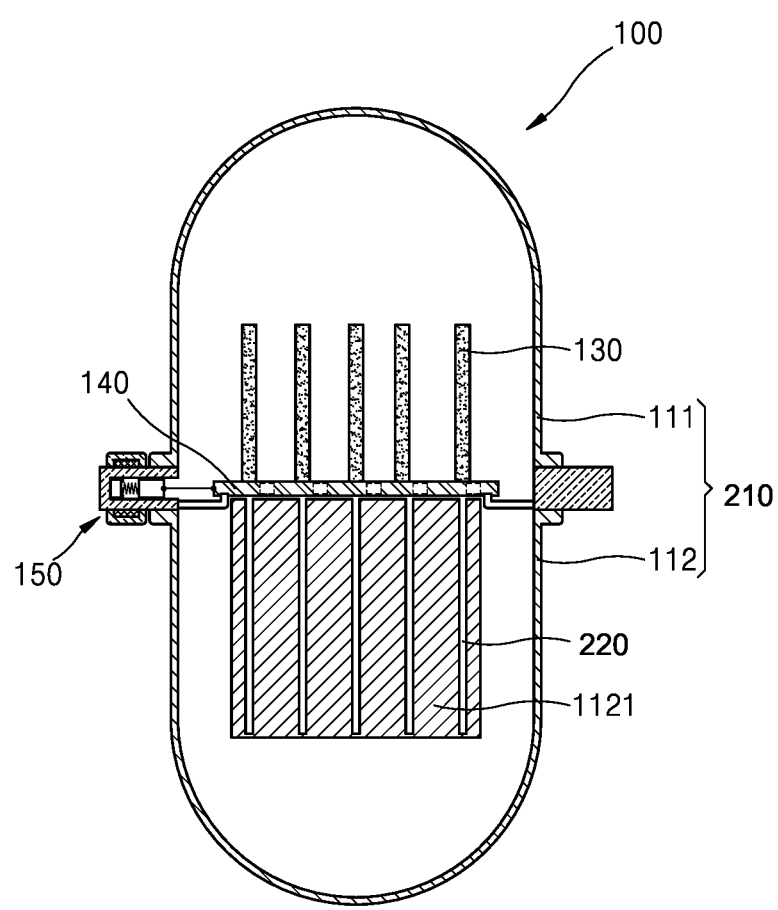
FIG. 4 is a cross-sectional view of a secondary shutdown structure of a nuclear reactor according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A secondary shutdown structure for a nuclear reactor according to one or more embodiments of the present disclosure will be described in detail below with reference to accompanying drawings.

A secondary shutdown structure 100 of a nuclear reactor according to an embodiment includes a nuclear reactor vessel 210, a guide pipe 220, a storage container 130, a sliding door 140, and a driver 150.

The nuclear reactor vessel 210 includes an upper nuclear reactor vessel 111 and a lower nuclear reactor vessel 112 that are coupled to each other. A plurality of nuclear fuel assemblies 1121 are arranged in the lower nuclear reactor vessel 112, and guide pipes 220 capable of accommodating neutron absorbers 131 are provided among the plurality of nuclear fuel assemblies 1121.

The upper nuclear reactor vessel 111 includes the storage container 130 for secondary shutdown of the nuclear reactor, and the neutron absorbers 131 are provided in the storage container 130.

A plurality of guide pipes 220 are arranged in the lower nuclear reactor vessel 112 and are spaced apart from one another among the plurality of nuclear fuel assemblies 1121. The storage container 130 is provided right above the guide pipe 220, and thus, the neutron absorbers 131 falling down due to weights thereof may be inserted to the guide pipe 220.

The storage container 130 is provided to correspond to each of the plurality of guide pipes 220 in the upper nuclear reactor vessel 111, contains the neutron absorbers 131 therein, and has an outlet opening towards each guide pipe 220. The neutron absorbers 131 contained in the storage container 130 are inserted to the guide pipe 220 of the lower nuclear reactor vessel 112 to operate secondary shutdown of the nuclear reactor.

Figure 5:
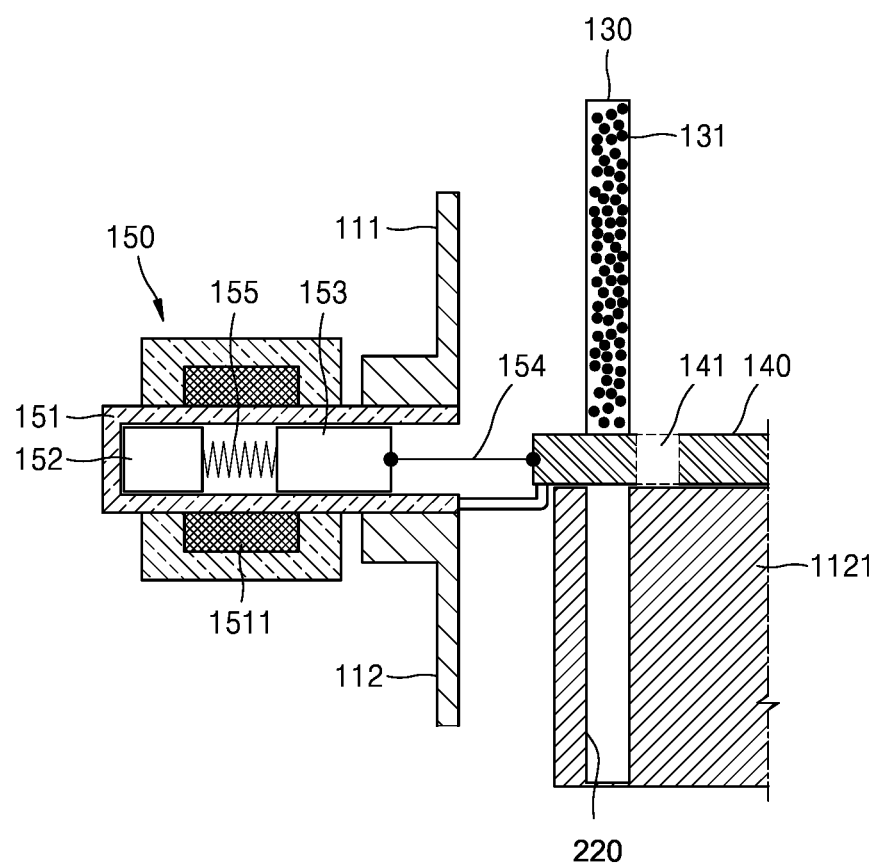
FIG. 5 is a cross-sectional view showing an enlarged view of a component in FIG. 4.

In the storage container 130, the neutron absorber 131 may be composed of a plurality of balls or as a single rod, and in FIG. 5, the neutron absorber 131 composed of as a plurality of balls is shown.

The sliding door 140 is provided between the plurality of storage containers 130 and the guide pipes 220 to slide between an opening location (a location of FIG. 6) and a closing location (a location of FIG. 5), and includes a plurality of through holes 141 to communicate with the outlet of each storage container 130 at the opening location.

The sliding door 140 is formed as a plate, and includes the plurality of through holes 141 penetrating therethrough. The sliding door 140 may be provided as a narrow bar type or a wide plate type.

The sliding door 140 is arranged under the plurality of storage containers 130 to be capable of sliding horizontally in contact with lower ends of the storage containers 130.

Here, each of the plurality of through holes 141 is formed in the sliding door 140 in the same arrangement as that of the storage container 130. When the sliding door 140 is at the opening location, the through hole 141 communicates with the outlet of the storage container 130 so as to open the outlet of the storage container 130, and when the sliding door 140 slides to the closing location, the opening lower end of each storage container 130 is closed.

Therefore, during a normal state, the sliding door 140 is placed at the closing location to close the lower ends of the storage containers 130, and then, the neutron absorber 131 is safely contained in the storage container 130.

When a secondary shutdown of the nuclear reactor is necessary, the sliding door 140 slides to the opening location, and accordingly, the through holes 141 are aligned with the opening lower ends of the storage containers 130. Thus, the neutron absorber 131 in the storage container 130 falls down due to the weight of itself and enters the guide pipe 220, and then, the nuclear reactor is shut down.

The driver 150 is provided to move the sliding door 140 horizontally. The driver 150 operates when receiving a predetermined signal applied from a controller (not shown), and makes the sliding door 140 move between the opening location and the closing location.

The driver 150 is at a side surface of the nuclear reactor vessel 210. In detail, the driver 150 includes a body 151, a fixed magnet 152, a movable magnet 153, a connector 154, and a first spring 155.

The body 151 includes an accommodation space extending in a direction therein, and a coil 1511 is wound on an outer circumference of the body 151. In addition, the body 151 is open towards the sliding door 140. The body 151 is provided on the side surface of the nuclear reactor vessel 210, in detail, middle of the nuclear reactor vessel 210 where the upper nuclear reactor vessel 111 and the lower nuclear reactor vessel 112 are coupled, and protrudes from the middle of the nuclear reactor vessel 210 towards left and right directions. The body 151 communicates with an internal space of the nuclear reactor vessel 210 and is configured to seal the internal space of the nuclear reactor vessel 210 with the nuclear reactor vessel 210.

The fixed magnet 152 is fixedly installed in the accommodation space of the body 151, and in detail, is disposed at a closed side (inside) of the accommodation space. The movable magnet 153 is arranged at an opening side being capable of sliding.

The movable magnet 153 may slide within the accommodation space of the body 151. When an electric current is applied to the coil 1511 wound on the outer circumference of the body 151, the movable magnet 153 moves towards the fixed magnet 152 due to a magnetic force between the fixed magnet 152 and the movable magnet 153. In more detail, the movable magnet 153 is arranged closer to the sliding door 140 than the fixed magnet 152 within the accommodation space.

The connector 154 connects the movable magnet 153 to the sliding door 140, to make the sliding door 140 slide together with the movable magnet 153. An end of the connector 154 is connected to the movable magnet 153 via a hinge, and the other end of the connector 154 is connected to the sliding door 140 via a hinge. Thus, the sliding door 140 moves according to the movement of the movable magnet 153.

The first spring 155 is provided between the fixed magnet 152 and the movable magnet 153 to elastically bias the movable magnet 153 in a direction away from the fixed magnet 152, and thus, the sliding door 140 may maintain at the closing location. A distance between the fixed magnet 152 and the movable magnet 153 is maintained constantly by the first spring 155, and in this state, the sliding door 140 maintains the closed state. In addition, when the electric current is applied to the coil 1511 and a magnetic force generates, the movable magnet 153 moves towards the fixed magnet 152 against the elastic force of the first spring 155, and then, the sliding door 140 is moved to the opening location. In addition, when application of the electric current to the coil 1511 is suspended, the movable magnet 153 moves towards the closed location due to the elastic force of the first spring 155.

Operations according to the embodiment of the present disclosure are as follows.

FIG. 5 shows a state in which the sliding door 140 is at the closing location. When the nuclear reactor normally operates, the movable magnet 153 elastically supported by the first spring 155 in a state where the fixed magnet 152 is fixed in the body 151 places the sliding door 140 at the closing location. When the sliding door 140 is located at the closing location, the sliding door 140 closes the opening at the lower end of the storage container 130, and accordingly, the neutron absorber 131 in the storage container 130 is contained in the storage container 130.

Figure 6:
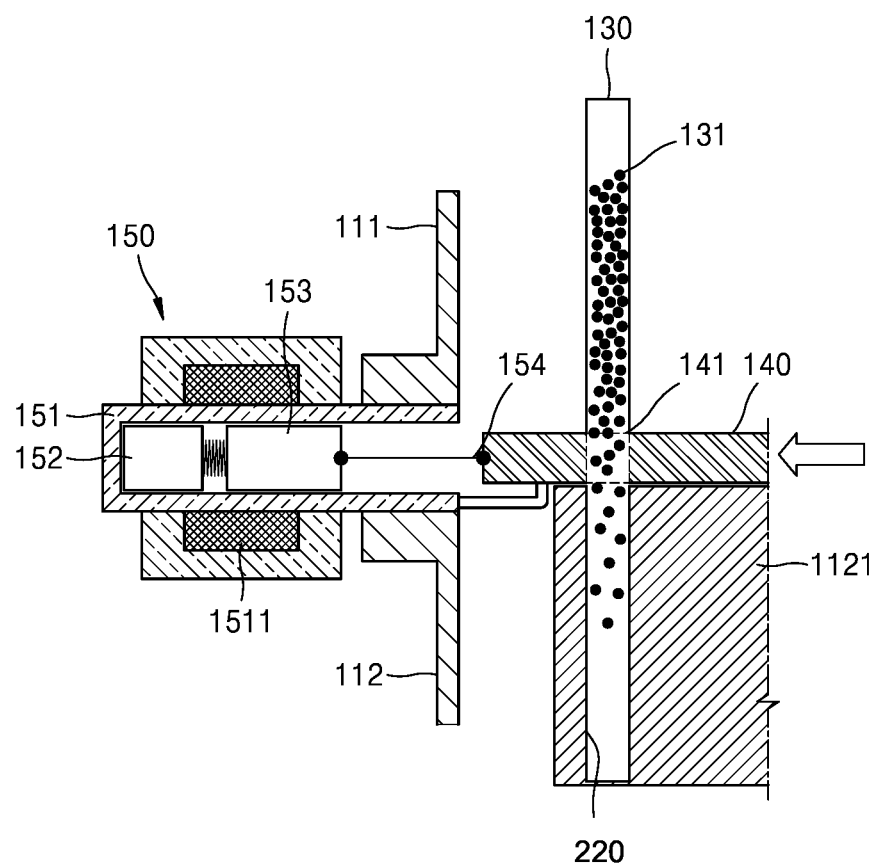
FIG. 6 is a diagram illustrating operations of FIG. 5.

In addition, when there is a need to shut down the nuclear reactor, the electric current is applied to the coil 1511, and then, as shown in FIG. 6, the movable magnet 153 moves towards the fixed magnet 152 overcoming the elastic repulsive force of the first spring 155 due to the magnetic force between the fixed magnet 152 and the movable magnet 153. Here, the sliding door 140 connected to the movable magnet 153 via the connector 154 moves towards the opening location with the movable magnet 153. When the sliding door 140 is at the opening location, the through hole 141 of the sliding door 140 is aligned with the opening at the end of the storage container 130, and accordingly, the neutron absorber 131 in the storage container 130 freely falls due to gravity and is inserted between the nuclear fuel assemblies to shut down the nuclear reactor.

According to the secondary shutdown structure of the nuclear reactor of the present disclosure, 1) the secondary shutdown system of the nuclear reactor may be implemented without using a boric acid solution, and 2) interference with other devices or structures in the nuclear reactor may be reduced because of a simple structure. Also, 3) the driver has excellent operating reliability because of the simple structure, and 4) reliability may be further improved because the neutron absorber falls down due to the gravity. In particular, the plurality of through holes are formed in a single sliding door, and accordingly, the plurality of storage containers may be simultaneously controlled.

The secondary shutdown structure of the nuclear reactor according to the present disclosure may be modified as follows.

Figure 7:
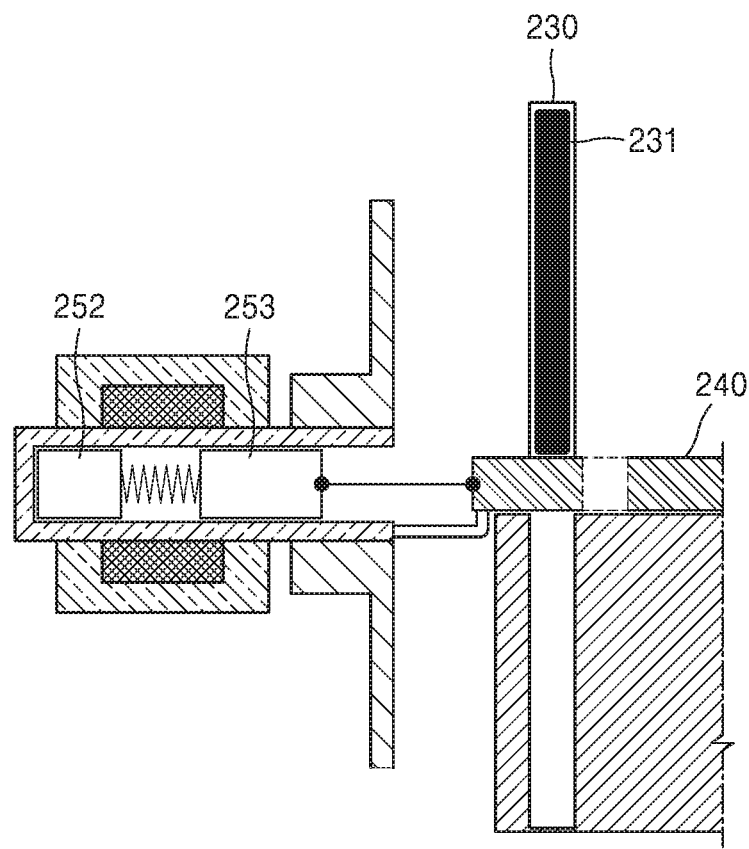
FIG. 7 is a diagram of a secondary shutdown structure of a nuclear reactor according to an embodiment of the present disclosure.
Figure 8:
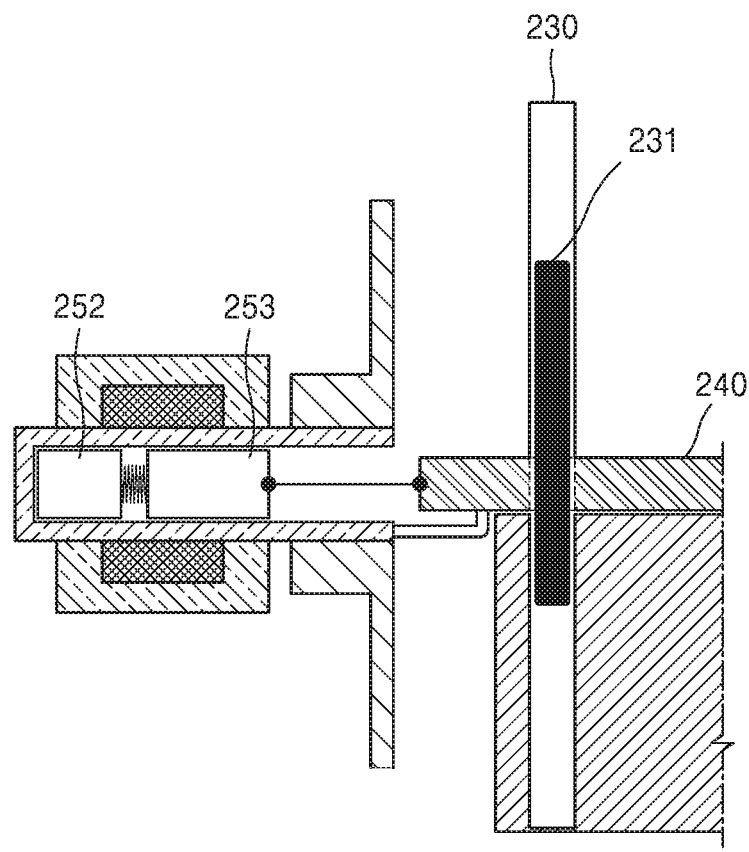
FIG. 8 is a diagram illustrating operations of FIG. 7.

In FIGS. 7 and 8, a neutron absorber 231 is composed of a rod type, not a plurality of balls. That is, the neutron absorber 231 of a rod type is provided in each of storage containers 230. In FIG. 7, when the nuclear reactor normally operates, a sliding door 240 is at a closing location. In this case, the neutron absorber 231 of the rod type is contained in the storage container 230. In addition, when there is a need to shut down the nuclear reactor, a movable magnet 253 moves towards a fixed magnet 252 and the sliding door 240 moves to the opening location as shown in FIG. 8, and accordingly, through holes 241 in the sliding door 240 are aligned with openings at lower ends of the storage container 230, and the neutron absorber 231 of the rod type in the storage container is inserted among the nuclear fuel assemblies to shut down the nuclear reactor.

Figure 9:
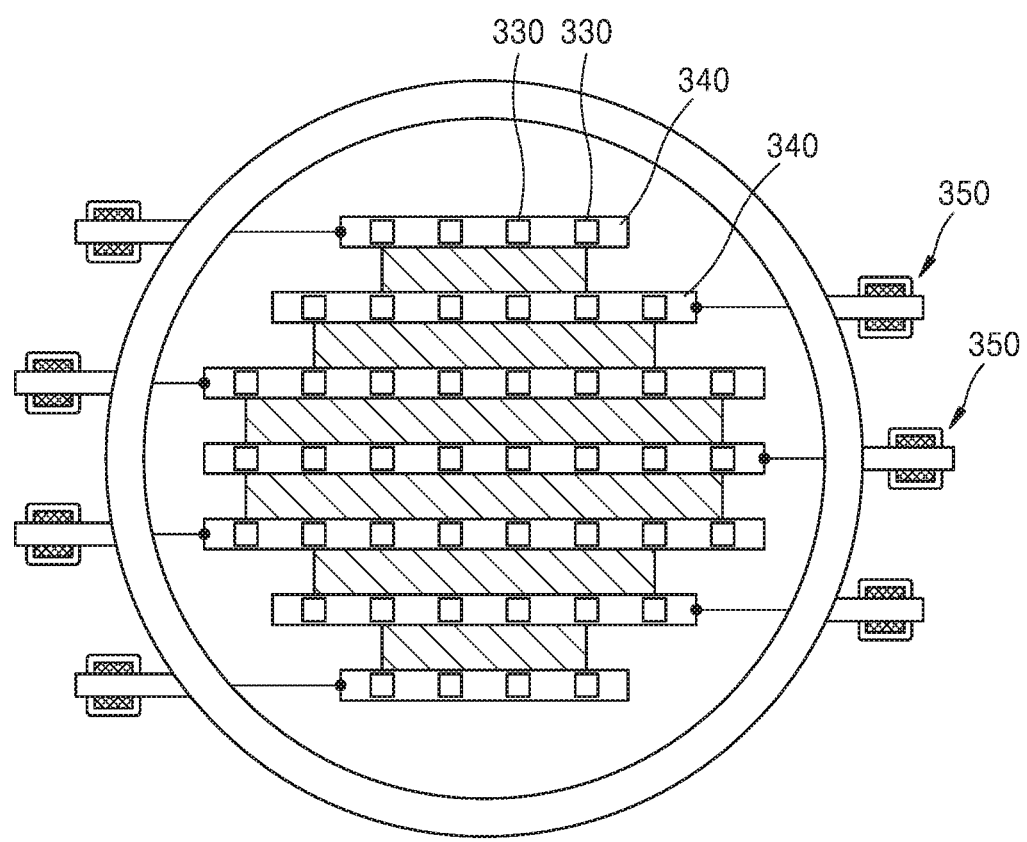
FIG. 9 is a cross-sectional view of a secondary shutdown structure of a nuclear reactor, according to an embodiment of the present disclosure.

Also, in FIG. 9, a plurality of drivers 350 are provided around the nuclear reactor vessel, and a sliding door 340 having a plurality of through holes is connected to each of the drivers 350 in a hinge type. When the sliding door 340 slides by driving of the driver 350, a plurality of storage containers 330 arranged with respect to each sliding door 340 may be open and closed simultaneously. Through the above structure, an internal structure of the nuclear reactor is simplified, and the number of the drivers may be reduced.

Figure 10:
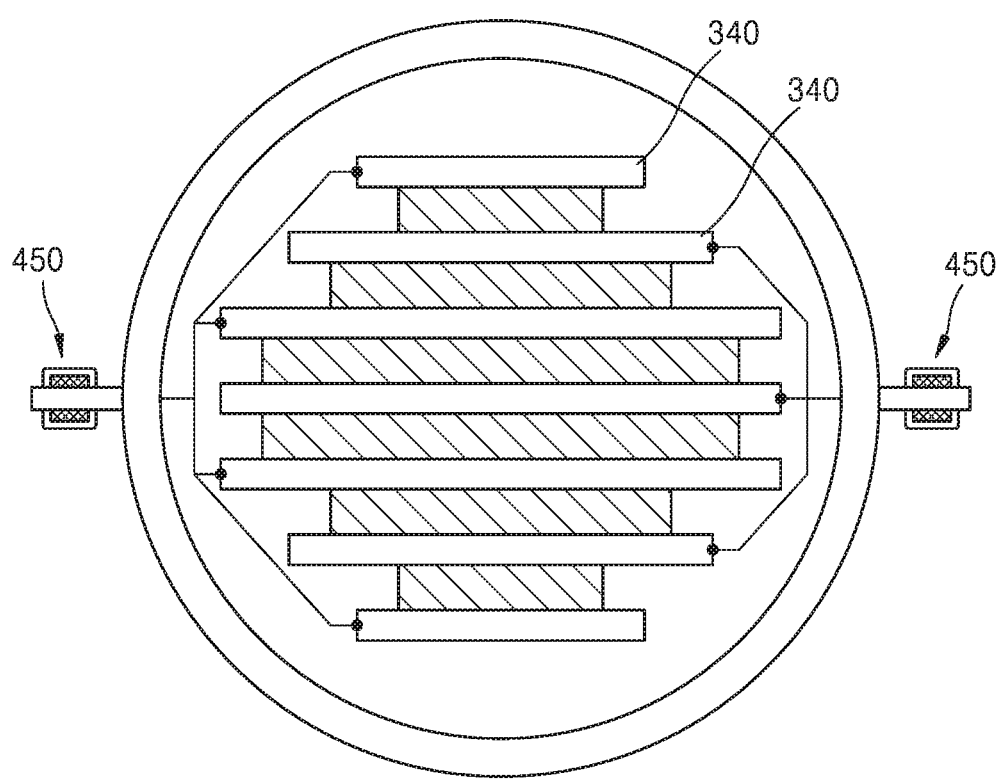
FIG. 10 is a cross-sectional view of a secondary shutdown structure of a nuclear reactor, according to an embodiment of the present disclosure.

Also, in FIG. 10, a plurality of drivers 450 are arranged around the nuclear reactor, and a plurality of sliding doors 440 are connected to each of the drivers 450 in a hinge type. As described above, by reducing the number of drivers, when a plurality of sliding doors are driven, a simple structure may be obtained comparing with the secondary shutdown structure of the nuclear reactor shown in FIG. 8.

Figure 11:
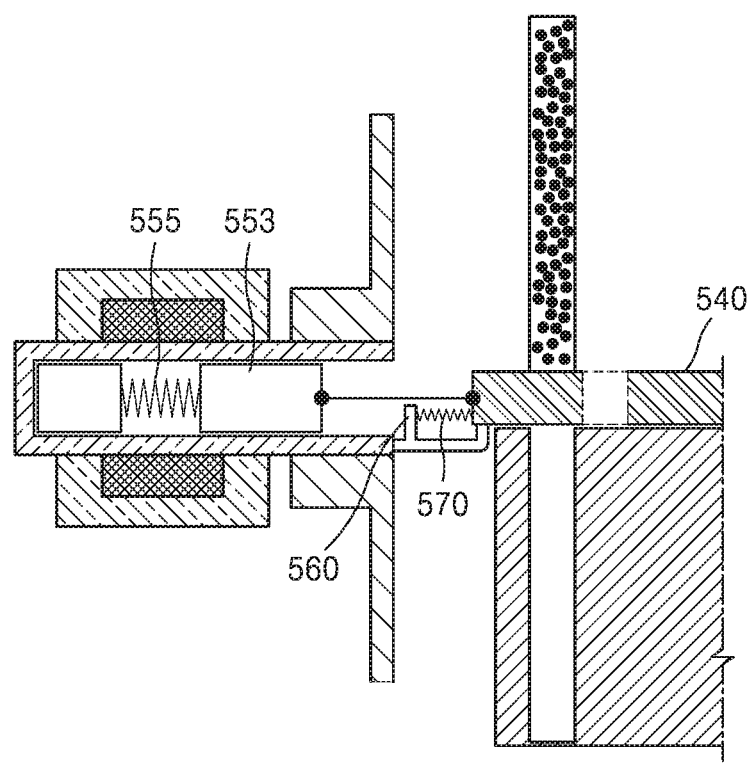
FIG. 11 is a diagram of a secondary shutdown structure for a nuclear reactor according to an embodiment of the present disclosure.

FIG. 11 shows an example in which a second spring 570 is provided between a movable magnet 553 and a sliding door 540. In detail, a door supporter 560 is provided spaced apart from the sliding door 540, and the second spring 570 is provided between the door supporter 560 and an end of the sliding door 540. The sliding door 540 is elastically biased towards the closing location by the second spring 570. The second spring 570 may maintain the sliding door 540 at the closing location even when the drivers and the sliding door 540 have to be separated from each other for fuel shuffling.

Figure 12:
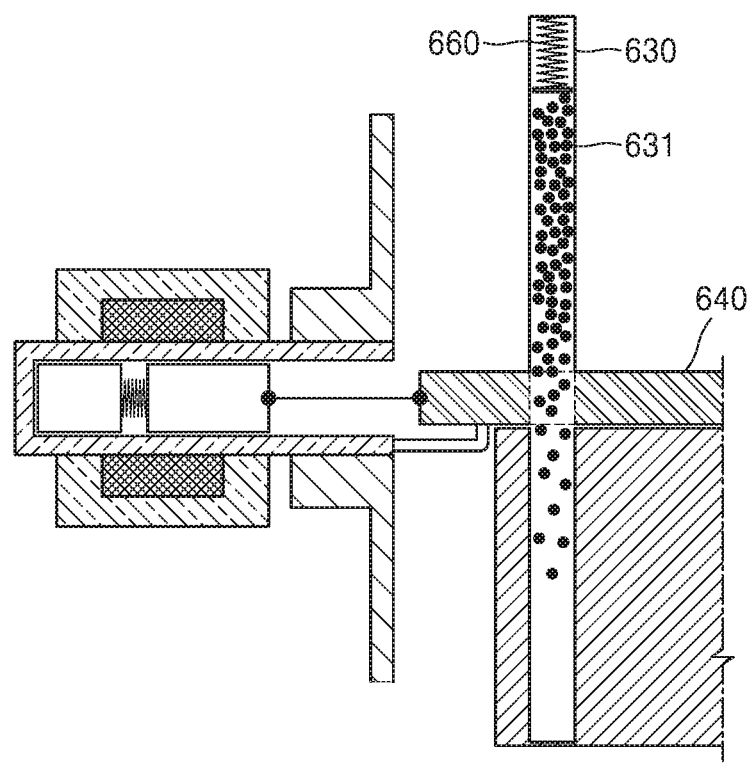
FIG. 12 is a diagram illustrating a secondary shutdown structure of a nuclear reactor and operating principles, according to an embodiment of the present disclosure.

FIG. 12 shows that a third spring 660 is provided in a storage container 630 for effectively guiding falling of a neutron absorber 631. In detail, a third spring 660 is provided at an upper portion in a storage container 630, and a plurality of ball type neutron absorbers 631 are provided under the third spring 660. When a spring door 640 moves to the opening location, the neutron absorbers 631 may effectively fall down due to the weight of the neutron absorbers 631 and the elastic force of the third spring 660.

Figure 13:
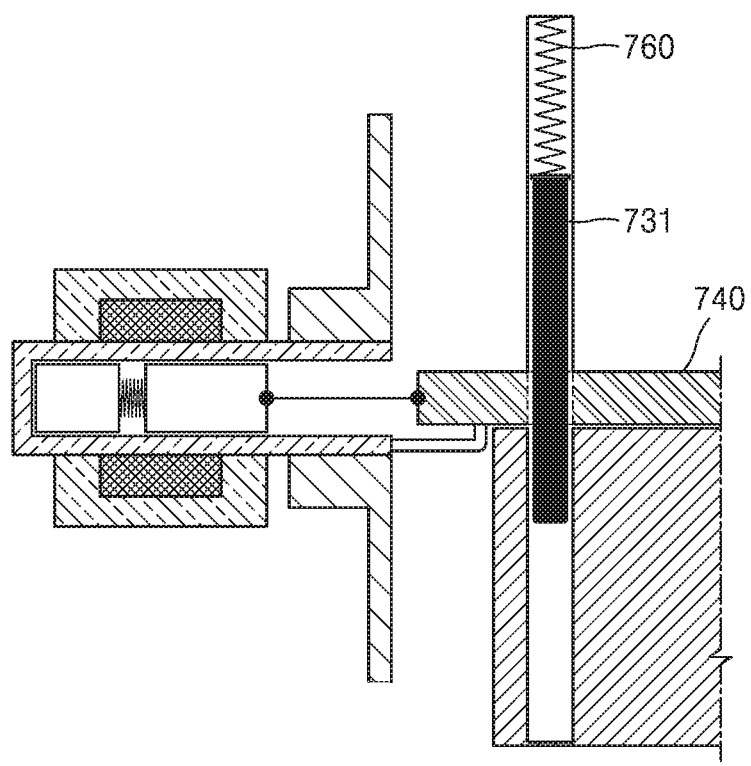
FIG. 13 is a diagram showing an example in which a neutron absorber is provided as a rod in the embodiment of FIG. 12.

FIG. 13 shows an example, in which a neutron absorber 731 of a rod type is provided in the embodiment of FIG. 12. When a sliding door 740 moves to the opening location, the neutron absorber 731 of the rod type may effectively fall down due to the weight of the neutron absorber 731 itself and an elastic force of a third spring 760.

As above, the secondary shutdown structure of the nuclear reactor is described with reference to various embodiments.

According to the present disclosure, the secondary shutdown of the nuclear reactor may be easily realized without using a boric acid solution.

Also, according to the present disclosure, interference with other devices or structures in the nuclear reactor may be reduced because of a simple structure.

Also, the driver has a simple structure, and has an excellent operating reliability.

In addition, the neutron absorber falls down by the gravity, the spring, or a combination thereof, the operating reliability is improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A secondary shutdown structure of a nuclear reactor, the secondary shutdown structure using a sliding door and comprising:
    a nuclear reactor vessel comprising an upper nuclear reactor vessel and a lower nuclear reactor vessel that are coupled to each other;
    a plurality of guide pipes arranged to be spaced apart from one another among a plurality of nuclear fuel assemblies in the lower nuclear reactor vessel;
    a plurality of storage containers arranged in the upper nuclear reactor vessel to respectively correspond to locations of the plurality of guide pipes, wherein each of the plurality of storage containers has a neutron absorber contained therein and has an outlet opening towards each of the plurality of guide pipes;
    the sliding door provided between the plurality of storage containers and the plurality of guide pipes, the sliding door sliding between an opening location and a closing location and the sliding door having a plurality of through holes communicating with the outlets of the plurality of storage containers at the opening location; and
    a driver configured to move the sliding door in a horizontal direction, the driver comprises:
        a body having an accommodation space extending in a direction therein, the body having a coil wound there around and the body opening towards the sliding door;

a fixed magnet fixedly installed in the accommodation space of the body;

a movable magnet sliding within the accommodation space of the body, the movable magnet moving towards the fixed magnet by a magnetic force between the fixed magnet and the movable magnet when an electric current is applied to the coil; and a connector configured to connect the movable magnet to the sliding door, wherein the sliding door slides along with the movable magnet by the connector, wherein, when the sliding door is at the opening location, the plurality of through holes are aligned with the outlets of the plurality of storage containers and the neutron absorber in each of the plurality of storage containers passes through the through hole to move into each guide pipe, and when the sliding door is at the closing location, the outlet of each storage container is closed and the neutron absorber stays in the storage container.

2. The secondary shutdown structure of claim 1, wherein the driver is at a side surface of the nuclear reactor vessel.

3. The secondary shutdown structure of claim 1, wherein, when the sliding door is at the opening location, the neutron absorber in the storage container falls down due to a weight of the neutron absorber itself to enter the guide pipe.

4. The secondary shutdown structure of claim 1, wherein a first spring is provided between the fixed magnet and the movable magnet, the first spring elastically biasing the movable magnet away from the fixed magnet to maintain the sliding door at the closing location.

5. The secondary shutdown structure of claim 1, wherein a door supporter is arranged to be spaced apart from the sliding door, and a second spring is provided between the door supporter and an end of the sliding door to elastically bias the sliding door towards the closing location.

6. The secondary shutdown structure of claim 1, wherein a third spring is provided in the storage container to push and drop the neutron absorber downwards.

7. The secondary shutdown structure of claim 1, wherein the sliding door is configured to drop the neutron absorbers contained respectively in the plurality of storage containers simultaneously towards the lower nuclear reactor vessel.

8. The secondary shutdown structure of claim 1, wherein the nuclear reactor vessel is provided with a plurality of sliding doors therein, each of the plurality of sliding doors being connected to one driver.

9. The secondary shutdown structure of claim 1, wherein the body protrudes outwardly from a middle of the nuclear reactor vessel, and communicates with an internal space of the nuclear reactor vessel.

10. The secondary shutdown structure of claim 9, wherein the movable magnet is closer to the sliding door than the fixed magnet in the accommodation space.

* * * * *